July 11, 1933.  H. S. MESSING  1,917,538
HYDRAULIC TURBINE
Filed Aug. 13, 1931   7 Sheets-Sheet 1

INVENTOR
HJALMAR S. MESSING.
By Malcolm ... Attorney

July 11, 1933.  H. S. MESSING  1,917,538

HYDRAULIC TURBINE

Filed Aug. 13, 1931    7 Sheets-Sheet 2

Inventor
HJALMAR S. MESSING.

July 11, 1933.  H. S. MESSING  1,917,538
HYDRAULIC TURBINE
Filed Aug. 13, 1931   7 Sheets-Sheet 3

Inventor
HJALMAR S. MESSING
By Malcolm N. Gannett
Attorney

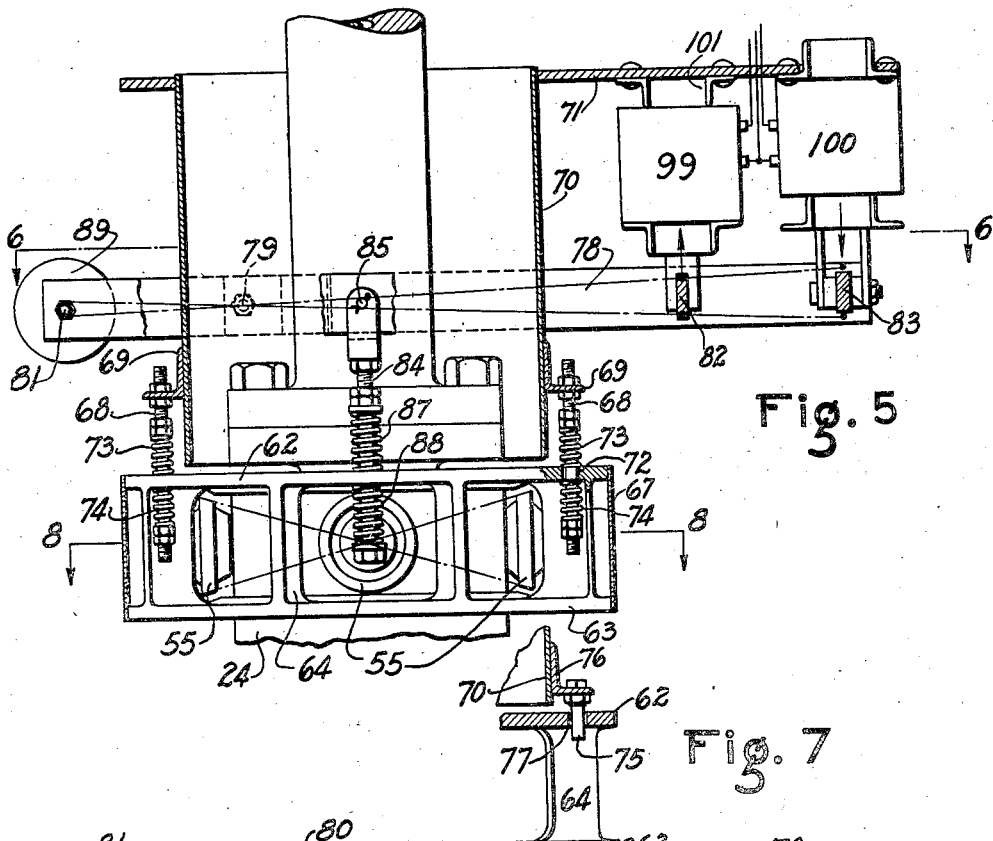
Fig. 5
Fig. 7
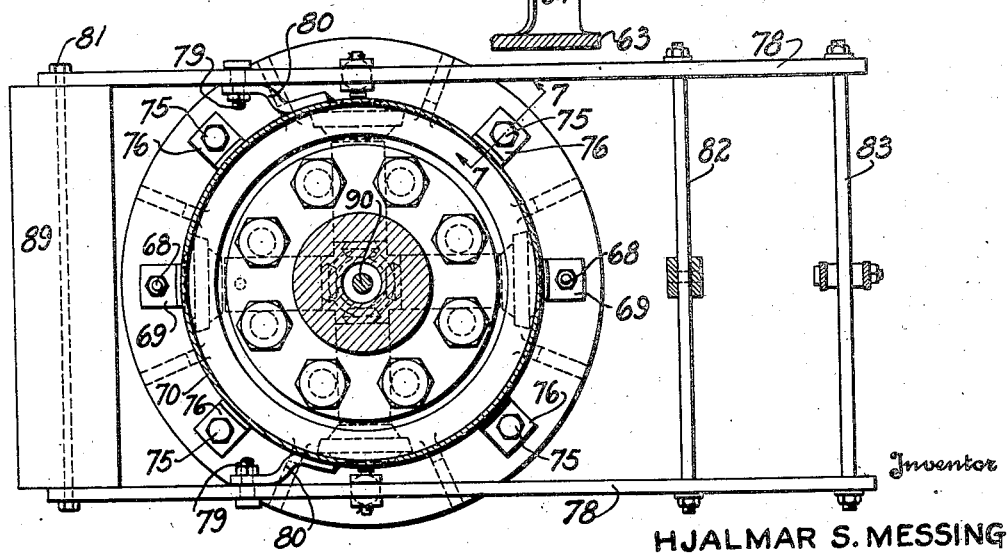
Fig. 6

July 11, 1933.  H. S. MESSING  1,917,538
HYDRAULIC TURBINE
Filed Aug. 13, 1931   7 Sheets-Sheet 5

HJALMAR S. MESSING.
Inventor
By Malcolm T. Garnett
Attorney

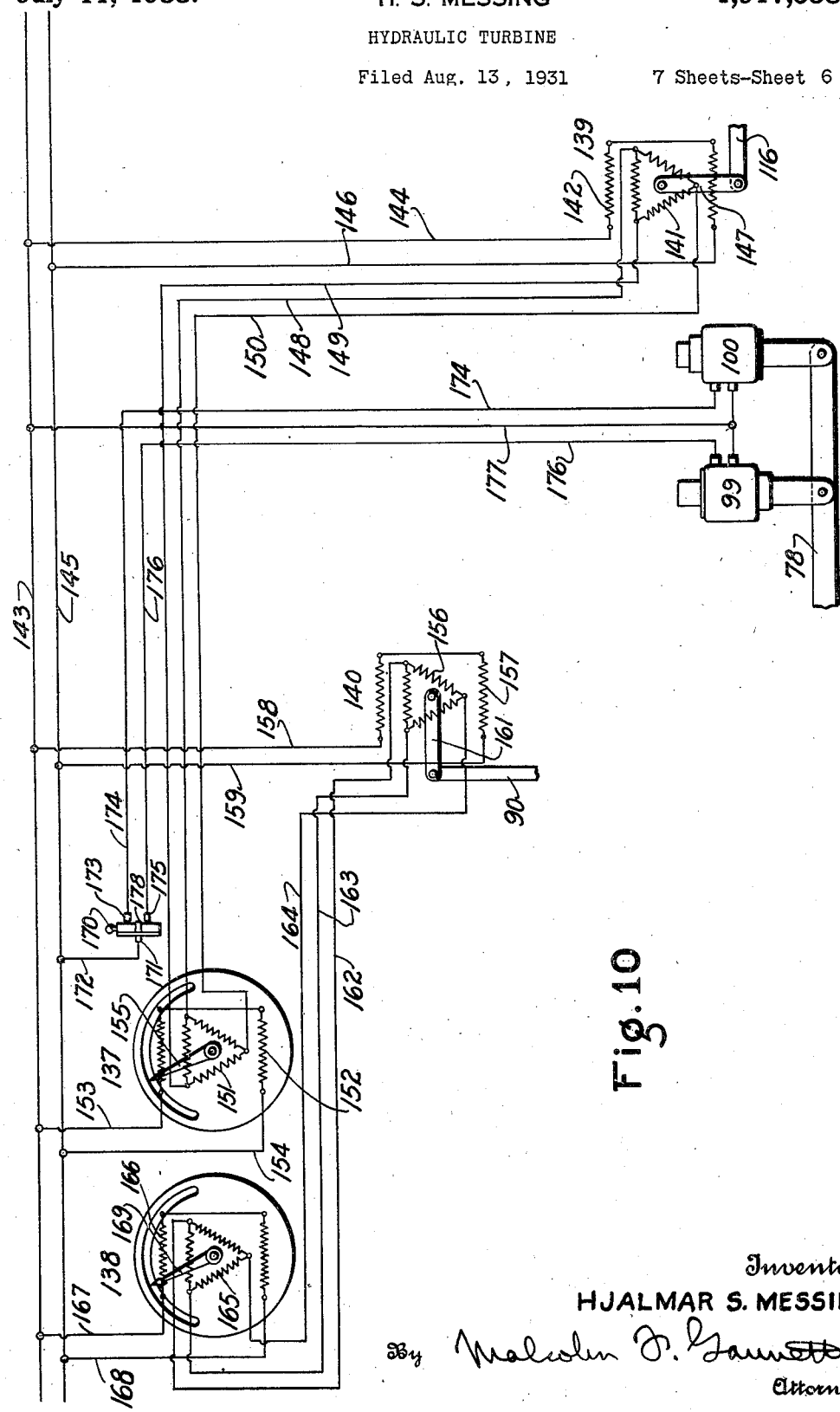

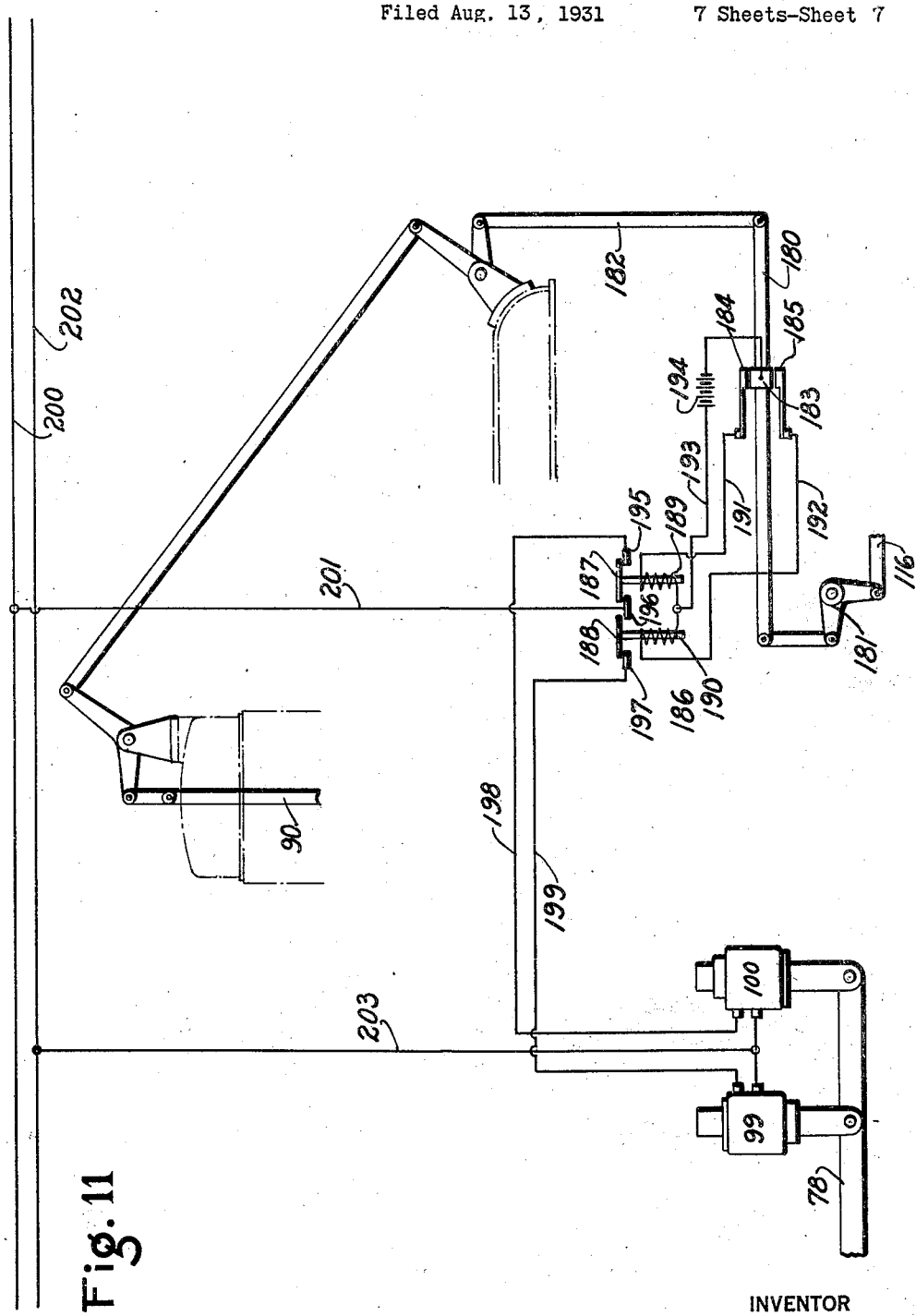

Patented July 11, 1933

1,917,538

UNITED STATES PATENT OFFICE

HJALMAR S. MESSING, OF MILWAUKEE, WISCONSIN, ASSIGNOR TO S. MORGAN SMITH COMPANY, OF YORK, PENNSYLVANIA, A CORPORATION OF PENNSYLVANIA

HYDRAULIC TURBINE

Application filed August 13, 1931. Serial No. 556,797.

This invention relates to improvements in hydraulic turbines of the type wherein the blades of the runner are adjustable to vary their angle and the area of the water opening through the runner to correspond with the angle and opening of the wicket gates or guide vanes which control the admission of water to the runner.

An object of the invention is to provide an improved turbine in which means are provided by which the operating mechanism for the runner blades is actuated by the wicket gates or guide vanes controlling means, so that when the gates are adjusted, the relative position of the blades will also be correspondingly adjusted and thereby maintain a definite relationship between the angle or position of the gates and the angle or position of the runner blades at all times.

Another object of the invention is to provide an improved turbine of the above type in which novel and effective means are provided for actuating the runner blades to adjust the angle thereof or the areas of the water passages between them while the turbine is in operation.

Another object of the invention is to provide an improved turbine of the above type in which means are provided for utilizing power from the revolving runner shaft for operating the adjusting mechanism of the runner blades.

Another object of the invention is to provide an improved turbine of the above type in which means are provided for controlling the operation of the runner blade adjusting means, either manually or automatically according to the angle and opening of the wicket gates.

Another object of the invention is to provide an improved turbine of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Fig. 5 is an enlarged side elevation, partly in section, showing the actuating means for the runner blade mechanism;

Fig. 6 is a horizontal section taken on the line 6—6 of Fig. 5;

Fig. 7 is a detail vertical section taken on the line 7—7 of Fig. 6;

Fig. 10 is a diagrammatic view of a modified form of electrical controlling means; and Fig. 11 is a diagrammatic view of another embodiment of electrical means for automatically maintaining the runner blades in angular positions corresponding with those of the gates during the running of the turbine.

The present invention is applicable to turbine installations of the general class employing a runner having blades or buckets which are rotatable or adjustable so that their angle is variable with respect to the runner axis. A turbine of this type is shown and described in United States Letters Patent No. 1,467,672 granted September 11, 1923 to Victor Kaplan. While in the instant case, the invention is shown applied to a turbine installation of one particular type, it will be understood that the invention is not restricted thereto, since the invention is applicable to turbine installations of other types.

Figure 1:
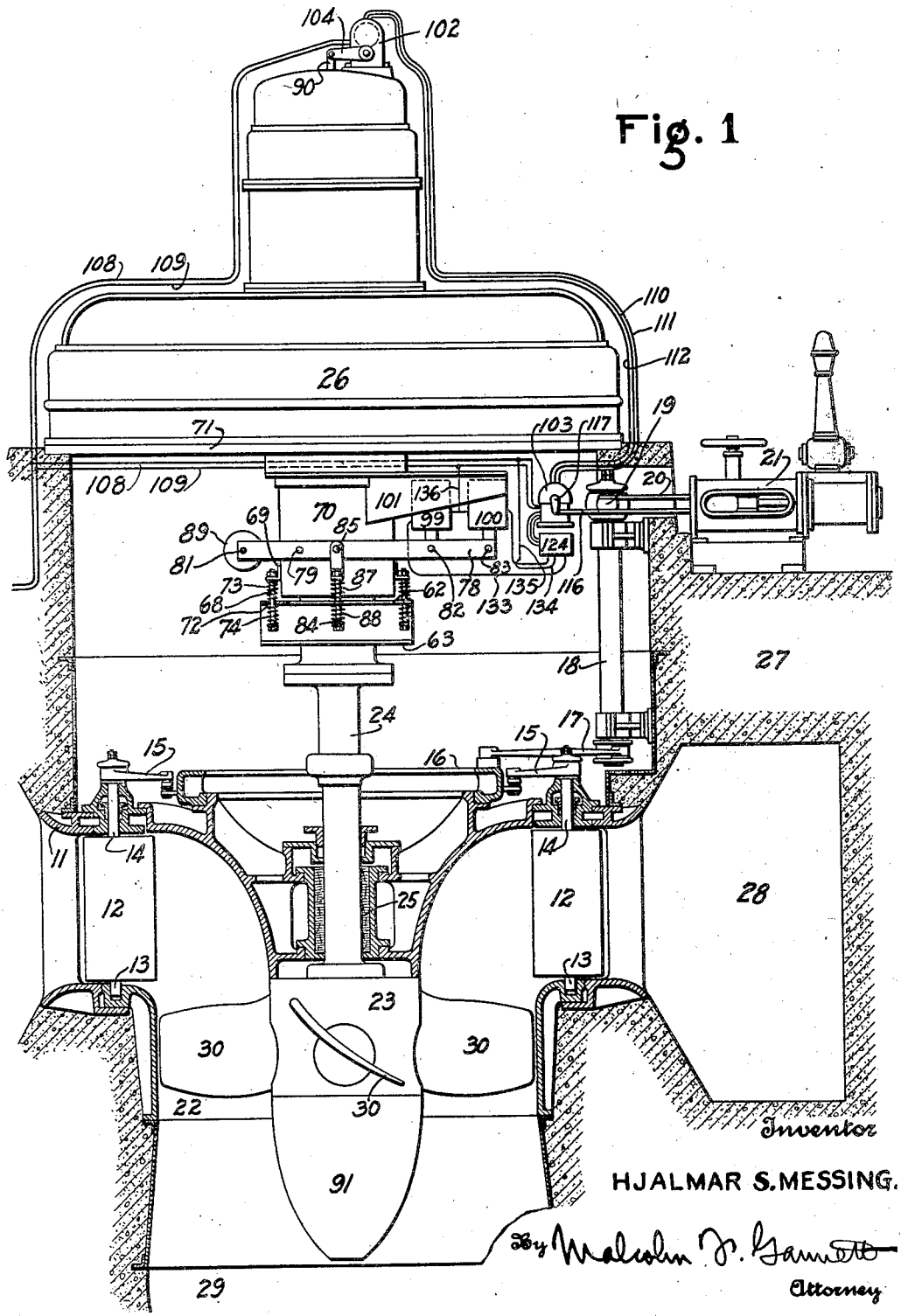
Figure 1 is a side elevation, partly in section, of a turbine employing a runner of the adjustable blade type and embodying blade adjusting and controlling means according to the present invention.

Referring to the drawings, and especially to Fig. 1, the turbine comprises a casing 11 which forms a peripheral water inlet in which are mounted an annular series of wicket gates or guide vanes 12. Projecting from the lower ends of the wicket gates or guide vanes 12, are trunnions 13 which are journalled in the adjacent portion of the casing 11. Likewise, stems 14 project upwardly from the wicket gates or guide vanes 12, said stems being journalled in suitable bearings carried by the casing 11 and terminating a suitable distance thereabove.

The wicket gates or guide vanes 12 are adapted to be rotated simultaneously into different angular positions to control the flow of water into the turbine in the usual manner, and for this purpose the upper ends of the stems 14 are usually provided with gate operating arms 15 which are fixed to said stems and connected by links to a gate adjusting ring 16.

The gate adjusting ring 16 is connected by link means 17 to a shaft 18. Fixed to the upper end of the shaft 18, is an arm 19 which is connected by links 20 to the controlling member of a governor 21. If so desired, the governor may be of the usual type employed with turbines to adjust the gates thereof during the running of the turbine and thereby maintain the turbine at its rated speed notwithstanding variations in the load thereon.

The lower portion of the turbine casing forms an axially directed chamber 22 in which the runner 23 operates. The hub of the runner 23 is fixed to the lower end of a hollow or tubular shaft 24 which is journalled in a suitable bearing 25 in the upper portion of the turbine casing. The upper end of the runner shaft 24 is connected to the part to be driven. In the present instance, the shaft 24 is directly connected to an electrical generator 26 which is mounted in superposed position above the turbine.

Any suitable type of setting may be used for the turbine installation, a concrete setting 27 being shown in the present instance. This setting forms a scroll case 28 which surrounds the turbine inlet and is connected to receive water from a flume or other source of supply. The portion of the setting below the turbine forms a draft tube 29 into which the water is discharged from the runner. The electrical generator 26 may rest on the top of the setting as shown.

Figure 3:
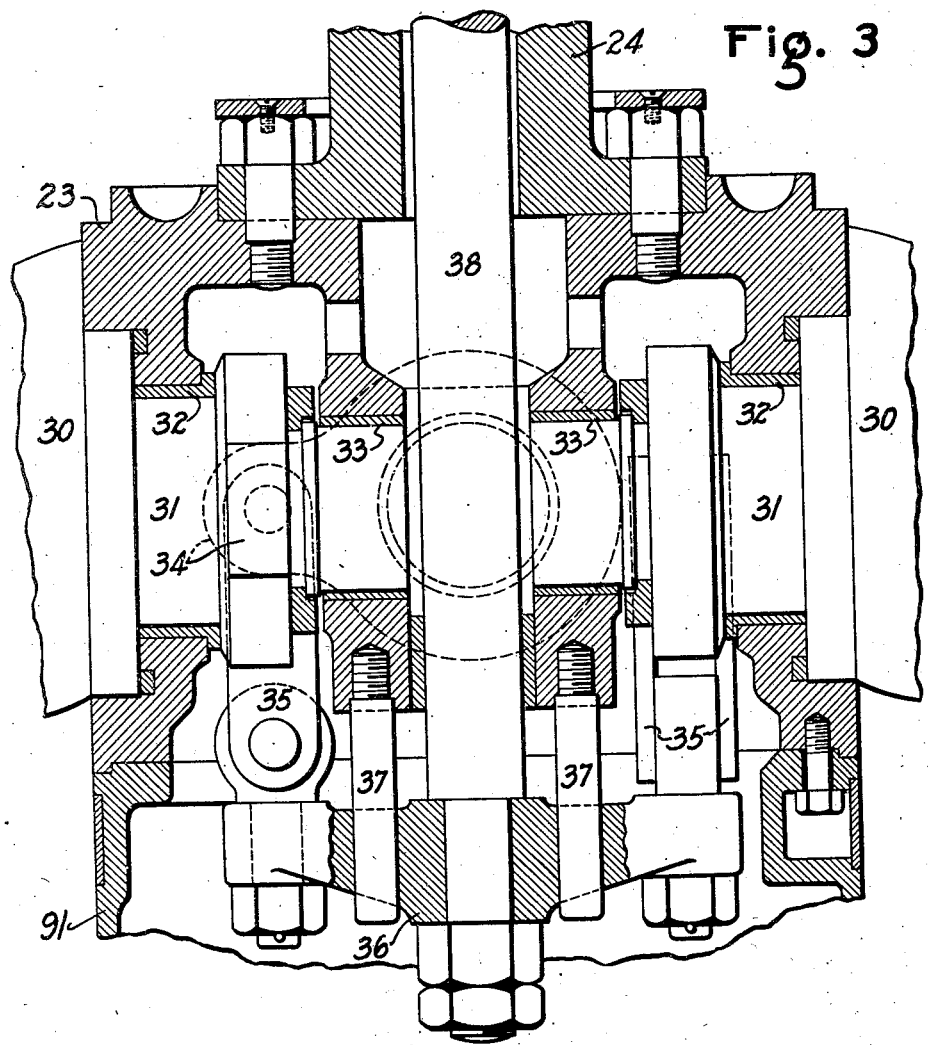
Fig. 3 is an enlarged vertical section of the lower end of the runner shaft, showing the construction of the parts within the hub of the runner.

As shown in Fig. 3, the hub of the runner 23 is bolted or otherwise fixed to the lower end of the runner shaft 24.

A suitable number of blades 30 are rotatably supported in the hub of the runner 23 and project radially therefrom. In the present instance four blades are shown (see also Fig. 1).

The inner end of each blade 30 is formed with a trunnion 31 which is journalled in bearings 32 and 33 supported in the hub. The construction is such that the blades are rotatable into different angular relationships with the axis of the runner.

Means are provided for simultaneously rotating all of the blades 30 and for maintaining them in equal angular relationship, such means comprising preferably an arm 34 rigidly fixed on the trunnion 31 of each blade and links 35 which pivotally connect the arms on the different blades to a crosshead 36. The crosshead 36 is guided to reciprocate in a direction axially of the runner by guide pins 37 which are mounted in the hub of the runner in the manner shown in Fig. 3.

It will be understood that the relative positions of the blades 30 govern the area of the water passages or openings between the blades, and that when the blades are rotated, the area of the water passages is increased or diminished depending upon the direction in which the blades are moved.

As shown in Figs. 1 and 3, a cap 91 is bolted or otherwise removably secured to the lower end of the hub of the runner 23. Since the runner hub is otherwise enclosed and the hub is hollow, the cap 91 provides a closed chamber or reservoir for containing a supply of grease for the lubrication of the various working parts of the mechanism contained within the hub of the runner.

The crosshead 36 is bolted or otherwise fixed to the lower end of an operating rod 38 which extends upwardly through the hollow runner shaft 24.

Figure 2:
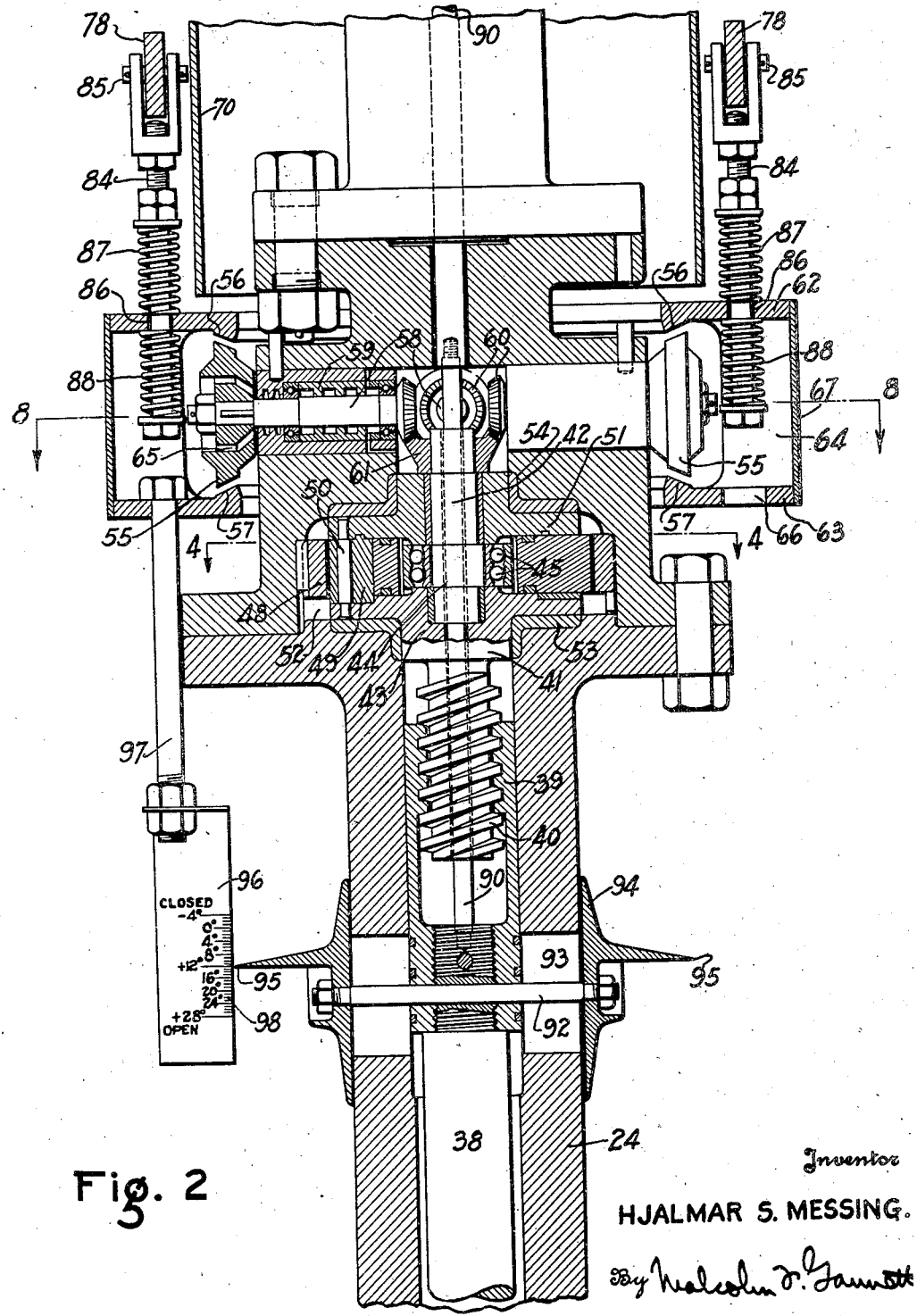
Fig. 2 is a vertical section on an enlarged scale of a portion of the runner shaft, showing the runner blade adjusting means.

As shown in Fig. 2, the upper end of the rod 38 is provided with an internally threaded sleeve 39 into which is fitted a screw 40. The screw 40 which is formed with a bore axially thereof, is connected to the driven member of a speed reducer 41 contained within the runner shaft 24.

Speed reducers of different kinds may be used, that shown being of the type shown and described in United States Letters Patent No. 1,543,791 granted June 30, 1925, to W. C. Pitter.

Figure 4:
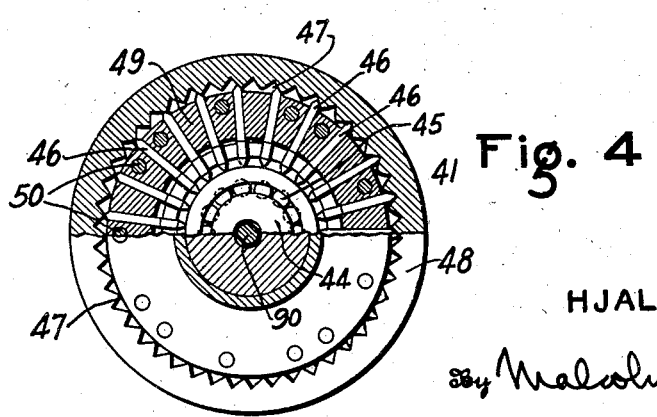
Fig. 4 is a transverse section taken on the line 4—4 of Fig. 2.

As shown in Figs. 2 and 4 the speed reducer comprises a driving member in the form of a shaft 42, and a driven member 43 having a hub to which the screw 40 is fixed. The driving member or shaft 42 has an eccentric 44 thereon which supports a ball bearing or other antifriction bearing 45.

As shown in Fig. 4, the outer member or race of the ball bearing 45 is surrounded by a series of radially disposed plungers 46. The inner ends of the plungers 46 bear on the outer race of the bearing 45 and the outer ends of said plungers are arranged to cooperate with teeth 47 formed concentrically within the outer or stationary casing member 48 which is keyed or otherwise fixed within the runner shaft 24. Both ends of the plungers 46 are beveled and the teeth 47 are beveled.

The number of teeth 47 differs from the number of plungers 46 so that rotation of the eccentric 44 will cause the plungers 46 to be forced outwardly in succession around the circular series of teeth 47 and in consequence will cause the plungers to creep around within the stationary casing member 48.

The plungers 46 are guided to reciprocate in a member 49 which is fixed to the driven member 43 by pins 50 so that the creeping motion of said plungers around the toothed interior of the stationary member 48 will be transmitted to the driven member 43. The motion of the driving member 42 is thus transmitted to the driven member 43, but at a great reduction in speed ratio.

The pins 50 may also secure the head 51 of the speed reducer to the driven member 43 thereof, as shown in Fig. 2. The driven member 43 and the head 51 provide bearings in which the driving member or shaft 42 revolves.

The speed reducer may be rotatably mounted within a hollow portion or chamber 52 formed within the runner shaft 24, by thrust bearings 53 and 54 of any suitable kind.

The speed reducer is actuated to effect changes in the angular positions of the runner blades by means which, according to the present invention, receives its motion and power from the revolving runner shaft 24, such means being preferably in the form of a reversible roller friction drive.

As shown in Figs. 2, 5, 6 and 8, the friction drive comprises a series of friction rollers 55 which project radially from and are carried in a circular path by the rotation of the runner shaft 24.

The friction rollers 55 are associated with a pair of tracks 56 and 57, one or the other of which is adapted to cooperate with said rollers and to thereby revolve them in one or the other direction.

Figure 8:
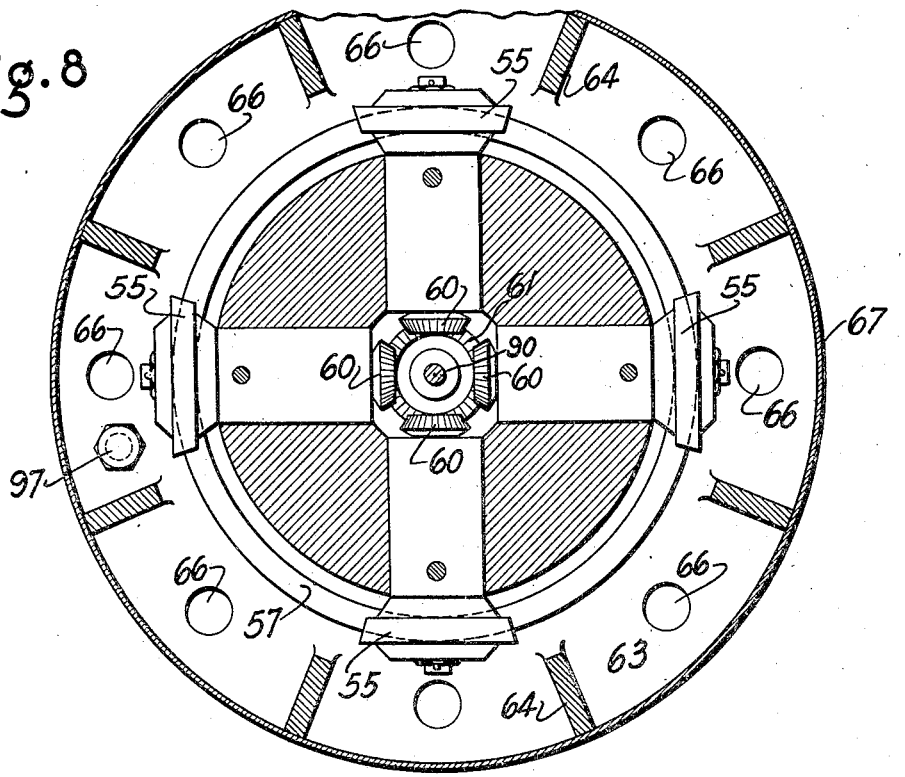
Fig. 8 is a horizontal section taken on the line 8—8 of Fig. 5.

As shown in Figs. 2 and 8, the rollers 55 are arranged symmetrically about the axis of the runner shaft 24, each roller being keyed or otherwise fixed to a shaft 58 journalled in a bearing 59 mounted radially in the runner shaft 24.

For the purpose of operatively connecting the friction rollers 55 to the driving member of the speed reducer, the inner end of each roller shaft 58 has a bevel gear 60 fixed thereon, and the bevel gears for the different friction rollers are in meshing relationship with a bevel gear 61 which is connected to the driving member or shaft 42 of the speed reducer.

The tracks 56 and 57 are beveled to conform with the beveled faces or circumferences of the friction rollers 55. These tracks are carried on or formed as a part of a frame which, as shown in Fig. 2, comprises a pair of spaced annular plates 62 and 63, which are rigidly connected by intervening webs 64. If so desired the webs 64 may be made integral with the plates.

The plates 62 and 63 are spaced apart sufficiently so that the distance between the tracks 56 and 57 is greater than the diameter of the rollers 55. With such construction, when the frame is located centrally of the height of the rollers as shown in Fig. 2, both tracks will be out of contact with the rollers.

The tracks 56 and 57 have preferably smooth friction faces to frictionally engage the peripheries of the rollers 55. In order to prevent the accumulation of oil or grease on the tracks, oil drain ducts 65 are formed in the roller housings. These ducts extend outwardly from the bearings of the roller carrying shafts in the manner shown in Fig. 2, so that any oil which might escape from the bearings will be directed towards openings 66 formed in the bottom plate 63. Preferably the frame is enclosed by a sheet metal side wall 67 which may be secured to the top and bottom plates 62 and 63 in any suitable manner.

The frame carrying the tracks 56 and 57 is supported by a plurality of rods or bolts 68 which are suspended from brackets 69 fixed on the outer side of a tubular housing 70. The housing 70 encloses the upper portion of the runner shaft 24, as shown in Figs. 1 and 5, and in turn is suspended from a support 71 mounted in the setting.

The lower portions of the rods or bolts 68 extend loosely through openings 72 in the top plate 62, as shown in Fig. 5.

Coiled springs 73 and 74 encircle the rods 68 above and below the top plate 62 and bear against the upper and lower sides thereof. The opposing actions of the upper and lower springs are so adjusted that normally the springs will support the frame in a position where the tracks 56 and 57 are out of contact with and are spaced equidistantly above and below the friction rollers 55 as shown in Figs. 2 and 5. When the parts are so disposed, the friction drive is in a neutral or non-operative position. The yield of the springs 73 and 74, however, will permit the frame to be lowered or raised and thus bring the track 56 or the track 57 into engagement with the friction rollers 55 while the frame is held against rotation, so that the rollers 55, as they are carried around with the runner shaft 24, will be caused to revolve, in one direction or the other on their own axis.

Rotation of the frame carrying the friction tracks 56 and 57 is prevented by the rods or bolts 68. However, as shown in Figs. 6 and 7, pins 75 may be employed to prevent movement of the frame relative to the housing 70.

The pins 75 are carried by brackets 76 which are fixed to the housing 70, and said pins are arranged to project into the holes 77 formed in the top plate 62. With this construction vertical movement of the frame carrying the tracks 56 and 57 relative to the stationary housing 70 is permitted.

The track frame is raised or lowered by means of a rocker frame to bring one or the other of the tracks 56 and 57 thereon into engagement with the friction rollers 55.

As shown in Figs. 1, 2, 5 and 6, the rocker frame comprises a pair of side members or arms 78 which are arranged at opposite sides of the stationary supporting housing 70.

The side members or arms 78 are pivotally supported on the housing 70 by pivot pins 79 which are mounted on brackets 80 secured to the opposite sides of said housing (see Fig. 6).

The side members or arms 78 are rigidly connected by cross members 81, 82 and 83, so that said members can swing in unison about the pivots provided by the pins 79.

As shown in Figs. 2, 5 and 6, the side members or arms 78 are operatively connected to the top plate 62 of the track frame by rods 84. The upper ends of the rods 84 are pivotally connected to the arms 78 by pivot pins 85. The lower portions of the rods 84 extend loosely through guide holes 86 in the plate 62.

Coiled springs 87 and 88 encircle each of the rods 84 above and below the plate 62 and bear respectively on the upper and lower sides thereof.

Rocking of the arms 78 vertically about the pivots 79 will reciprocate the rods 84 vertically and said rods will, through the action of the springs 87 and 88, transmit vertical movements to the track frame, the frame being raised or lowered to bring one or the other of the friction tracks 56 and 57 thereon into engagement with the friction rollers 55, according to the direction in which the arms 78 are rocked.

The rods 84 are preferably arranged to engage the top plate 62 at diametrically opposite sides thereof so that the weight of the track frame will be balanced. In this way the track frame will tend to hang in a level position with the tracks 56 and 57 spaced equidistantly around their circumferences from the friction rollers 55, when the frame is in its neutral position. Furthermore, the diametrical location of the rods 84 with respect to the track frame will cause the downward or upward pressure applied to the frame to bring the track 56 or 57 into engagement with the friction rollers 55, when the arms 78 are rocked in one direction or the other, to be applied uniformly around the circumference of the track.

The rocker frame and the parts connected thereto are preferably counterbalanced by a counterweight 89, which is mounted between the arms 78 and supported by the cross bar 81.

As shown in Figs. 1, 2 and 6, a restoring rod 90 is fixed at its lower end to the upper end of the operating rod 38 and extends upwardly through the hollow screw 40, reducing gear 41, the upper portion of the runner shaft 24, and the generator shaft, to the top of the generator 26, for a purpose to be hereinafter more fully described.

In operation, the bevel gear 61 will be driven in one direction or the other, depending upon whether the track 56 or the track 57 is brought into engagement with the friction rollers 55. The motion of the gear 61 will be transmitted through the speed reducer to the screw 40 and the latter rotating at greatly reduced speed within the threaded sleeve 39, will raise or lower the operating rod 38 and said rod will correspondingly raise or lower the cross head 36. The cross head acting through the links and arms hereinbefore described will simultaneously rotate the runner blades 30 about their trunnions as axes toward closed or open position or into any desired intermediate position. For example, the runner blades are moved toward closed position when the friction rollers 55 are engaged by the track 56 and are moved toward open position when the friction rollers 55 are engaged by the track 57. The runner blades maintain a set position or angle or opening while both of the tracks are out of engagement with the friction rollers.

As shown in Fig. 2, means are provided for indicating visually the position or angle of opening occupied by the runner blades. The runner blade operating rod 38 is provided with a pin 92 which is movable vertically therewith. The pin 92 extends through a diametrical slot 93 formed in the runner shaft 24, and the outer ends of said pin are connected to a sleeve 94 which is slidably mounted on the runner shaft 24. The sleeve 94 is formed with an annular flange 95, which is tapered outwardly so as to have a thin periphery.

A suitable graduated dial or scale 96 is supported in a stationary position by means of a rod 97 which depends from, and is carried by, the bottom plate 63 of the track frame of the friction driving mechanism. The scale 96 has formed thereon a series of graduations 98 which cooperate with the edge of the sleeve flange 95.

Since the runner blade operating rod 38 moves upwardly or downwardly under the action of the screw 40 when the runner blades are adjusted, the flange 95 will move vertically in correspondence therewith and thus serve as a pointer for indicating the position occupied by the runner blades at any time while the turbine is running. In this way an attendant is assisted in adjusting the runner blades to any desired angle.

The rocker arms 78 may be operated in different ways in order to adjust the angle or degree of opening of the runner blades to conform with the angle or opening of the gates which control the admission of water to the turbine. Obviously, the rocker arms may be operated for this purpose by hand or other power applied to the free ends thereof.

In the present embodiment of the invention, electrically operated means are employed for controlling the friction drive mechanism, thus enabling the runner blades to be adjusted automatically when the wicket gates are adjusted.

Figure 9:
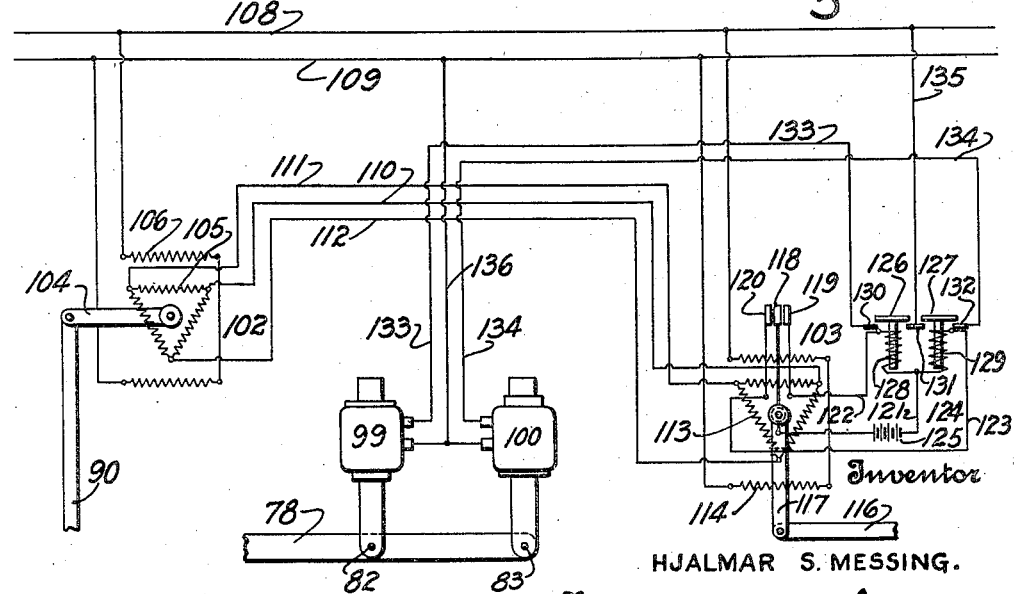
Fig. 9 is a diagrammatic view of the electrical controlling system shown in Fig. 1.

As shown in Figs. 1, 5 and 9 a pair of solenoids 99 and 100 are provided. These solenoids are mounted on a stationary support 101 which may be an extension of the stationary support 71. The armature or cores of the solenoids 99 and 100 are operatively connected to the cross members 82 and 83 respectively, which connect the rocker arms 78.

The solenoid 99 is of a construction which will cause it to pull its armature or core upwardly when the solenoid is energized, and thereby swing the rocker arms 78 upwardly about their center or fulcrum as provided by the pivots 79. This action will bring the track 57 into operative engagement with the friction rollers 55.

The solenoid 100 is of a construction which will cause it to push its armature or core downwardly when the solenoid is energized, and thereby swing the rocker arms 78 downwardly about their pivotal center or fulcrum. This action will bring the track 56 into operative engagement with the friction rollers 55.

In this way, when the solenoid 99 is energized the parts will be operated so as to cause the runner blades to be turned in one direction, and when the solenoid 100 is energized the runner blades will be turned in the opposite direction.

By the present invention means are provided which cooperate with the solenoids 99 and 100 so as to effect the adjustment of the runner blades to conform with different angles or positions of the wicket gates during the running of the turbine.

In the form of the invention shown in Figs. 1 and 9, I prefer to utilize a pair of self-synchronous electric motors which may be of the type used in so-called "Selsyn" systems similar to those disclosed in United States Letters Patents No. 1,576,189 granted March 9, 1926, to E. M. Hewlett, et. al. and No. 1,612,120 granted December 28, 1926, to L. E. Hilderbrand, to which reference may be had for a detailed description of the construction and mode of operation of such systems.

It is deemed sufficient to set forth that such systems comprise a transmitting device 102 and a receiving device 103. The devices 102 and 103 are similar in construction, each having a single phase field winding and a polycircuit armature winding, one of these windings being on the stator and the other winding on the rotor of the respective devices. The field windings are excited from a suitable source of single phase alternating current and thereby set up fields which interlink with their respective armature windings. The like points of the polycircuit armature windings are electrically connected so that a change in the angular position of the rotor of one device will set up unbalanced voltages in the armature windings in consequence of which a torque is developed which acts to bring the rotors of the different devices into the same or corresponding angular positions.

As shown in Fig. 9, the restoring rod 90, which is connected to the runner blades, is operatively connected by an arm 104 to the rotor of the transmitter 102.

The transmitter 102 has a three phase delta connected armature winding 105 and a field winding 106. One terminal of the field winding 106 is connected to a conductor 108 and the other terminal of the field winding 106 is connected to a conductor 109. The conductors 108 and 109 constitute a main power line for supplying single phase alternating current to the apparatus from a suitable source of supply, so that the field winding 106 is excited.

The different phase points of the armature winding 105 of the transmitter 102 are interconnected by conductors 110, 111 and 112 to the like phase points of the three phase armature windings 113 of the receiver 103.

The receiver 103 has a field winding 114; one terminal of which being connected to the conductor 108, and the other terminal of which is connected to the conductor 109, so that the field winding of the receiver is excited.

The link 20 of the governor 21 is connected by a link 116 to the operating lever 117 of a switch member 118 mounted rotatably on the shaft of the rotor of the receiver 103.

The switch member 118 has a contact which is disposed in spaced relation between the contacts of a pair of switch members 119 and 120 carried by the rotor of the receiver, so that the switch member 118 may swing into engagement with one or the other of the switch members 119 and 120 to make electrical contact therewith.

A pilot device 124 is provided for controlling the circuits through which current is supplied to the solenoids 99 and 100, said device comprising two switch members 126 and 127, which are operated respectively by relay coils 128 and 129.

The switch member 119 is connected by a conductor 122 to one terminal of the relay coil 128, and the switch member 120 is connected by a conductor 123 to one terminal of the relay coil 129, the switch member 118 being connected to the other terminals of said relay coils by a conductor 121.

The relay coils 128 and 129 are adapted to be energized by low voltage electric current as supplied from a storage battery 125 connected to the conductor 121. This constitutes what will hereinafter be referred to as the low voltage circuit.

The switch member 126 is adapted to engage contacts 130 and 131, and the switch member 127 is adapted to engage the contact 131 and a contact 132.

The contact 130 is connected to one terminal of the solenoid 99 by a conductor 133, and the contact 132 is connected to one terminal of the solenoid 100 by a conductor 134. The contact 131 is connected to the main line high voltage conductor 108 by a conductor 135, and the other main line high voltage conductor 109 is connected to the other terminals of the solenoids 99 and 100 by a conductor 136.

In operation, when the governor 21 operates to swing the wicket gates toward open or closed position to vary the gate opening to conform with the variations in the load on the turbine, the link 20 will operate through the link 116 and the lever 117, to swing the movable switch member 118 against either of the switch members 119 or 120, according to the direction in which the governor operates, thereby making an electrical contact between the switch members 118 and 119, or between the switch members 118 and 120, as the case may be.

The electrical contact of the switch members 118 and 119 or 120 closes the low voltage circuit of the pilot device 124, through the conductors 121, 122 or 123 respectively, so that either the relay coil 128 or the relay coil 129 is energized. When the relay coil 128 is energized the switch member 126 is engaged with the contacts 130 and 131, and when the relay coil 129 is energized the switch member 127 is engaged with the contacts 131 and 132.

When switch member 126 engages contacts 130 and 131 the circuit is closed through which high voltage single phase electrical current is supplied for energizing the solenoid 99 from conductor 108, through conductor 135, contacts 131, 126, and 130, conductor 133 to one terminal of the solenoid 99, thence through the coil of the solenoid, and from the other terminal of said solenoid through the conductor 136 to the conductor 109.

When switch member 127 engages contacts 131 and 132 the circuit is closed from the main line conductor 108, through conductor 135, contacts 131, 127 and 132, conductor 134 to one terminal of the solenoid 99, thence through the coil of the solenoid, and from the other terminal of said solenoid through the conductor 136 to the conductor 109, so that the solenoid 100 is energized.

When the solenoid 99 or 100 is energized, the rocker arms 78 will be swung upwardly or downwardly respectively and set the friction roller mechanism into operation to rotate the screw 40 and thereby rotate the runner blades toward open or closed position to conform with the position into which the gates have been shifted.

Since the restoring rod 90 is connected to the runner blade adjusting means and moves downwardly or upwardly while the runner blades are moving toward open or closed position respectively, and the restoring rod is connected by the arm 104 to the rotor of the transmitting device 102, the rotor of said transmitting device will begin to rotate as soon as the change in angle or position of the runner blades commences. The rotation of the rotor of the transmitting device 102 is transmitted to the rotor of the receiving device 103, under the influence of the voltages in the interlinked rotor windings tending to bring the rotors into angular agreement, so that the rotor of the receiving device 103 is rotated to a position corresponding to that into which the rotor of the transmitting device 102 has been rotated. This action of the rotor of the receiving device 103 causes the switch member 118 to be moved away from the switch member 119 or 120 with which it is in contact, so that the circuit through which the solenoid 99 or 100 is energized, is opened and such solenoid is de-energized.

When either solenoid is de-energized the arms 78 will be moved to a position in which the operation of the roller friction mechanism is interrupted. The runner blades will then have been brought into a position corresponding to the position of the gates. The parts will then remain so positioned relative to each other until the gates are again operated, whereupon a runner blade adjusting operation similar to that just described will again take place to automatically move the runner blades into proper position with respect to the position assumed by the gates.

The springs 87 and 88 which lower and raise the friction tracks 56 and 57 are of such strength as to allow the solenoids 99 and 100 to complete their full strokes and to press the tracks against the friction rollers 55 with the necessary force to effect rotation of the rollers, without requiring an absolutely exact relationship between the extreme positions of the solenoids and the operative positions of the tracks. The springs 87 and 88 are preferably larger or of greater strength than the springs 73 and 74 which normally hold the friction tracks 56 and 57 in neutral position, so that they may easily overcome the power of the springs 73 and 74 and bring one or the other of the tracks into agreement with the rollers 55 when one or the other of the solenoids is energized. However, the springs 73 and 74 have sufficient strength to promptly restore the tracks 56 and 57 and the arms 78 to neutral position when the respective solenoid is de-energized. The symmetrical arrangement of the friction rollers about the axis of the runner shaft 24 balances them and thereby avoids objectionable vibration, this being especially desirable in installations where the runner revolves at high speed.

In some installations of the turbine the governor 21 may be connected with an electrical indicating device which is located at a point remote from the turbine, such for instance as in the office or control room of the hydro-electric station. When this is the case it is desirable that the runner blades be controlled from the same point as is the governor, so that the position of the runner blades can be kept in proper relationship with the wicket gates.

One type of remote control for the runner blades and wicket gates is shown in Fig. 10, wherein there is shown a system comprising two electrically operated indicating devices 137 and 138, which are respectively associated with two transmitting devices 139 and 140. The devices 137, 138, 139, and 140 may comprise self-synchronous electrical motors of the type heretofore referred to, and each have a single phase field winding and polycircuit armature winding, one of these windings being on the stator and the other winding on the rotor of the respective devices. The field windings are excited from a suitable source of single phase alternating current and thereby set up fields which interlink with their respective armature windings. The like points of the polycircuit armature windings are electrically connected so that a change in angular position of the rotor of one device will set up unbalanced voltages in the armature winding, in consequence of which a torque is developed which acts to bring the rotors of the different devices into the same or corresponding angular positions.

The transmitter 139 has a three-phase delta connected armature winding 141 and a field winding 142. One terminal of the field winding 142 is connected to a main line conductor 143, by a conductor 144, and the other terminal of said field winding is connected to the other main line conductor 145, by a conductor 146. The rotor of the transmitter 139 is connected by a lever 147 to the link 116 heretofore described, which is connected to the link 20 of the governor 21, so that any movement of the governor will result in a corresponding movement being imparted to the rotor of the transmitter 139.

The conductors 143 and 145 supply single phase alternating current to the apparatus from a suitable source of supply, so that the field winding 142 is excited.

The different phase points of the armature windings 141 of the transmitter 139 are interconnected by conductors 148, 149 and 150 to the like phase points of the three-phase armature windings 151 of the electrical indicating device 137.

The indicating device 137 has a single phase field winding 152, one terminal of which is connected to the main line conductor 143 by a conductor 153, and the other terminal of which is connected to the other main line conductor 145 by a conductor 154, so that the field winding 152 is excited.

The rotor of the indicating device 137 is adapted to actuate an indicating hand or pointer 155, which cooperates with a suitably graduated scale for indicating the relative position of the wicket gates. The pointer 155 responds to changes in the angular position of the wicket gates owing to the transmission of equal angular motion to the rotor of the indicating device 137 from the rotor of the transmitter 139.

The transmitter 140 has a three-phase delta connected armature winding 156 and a field winding 157. One terminal of the field winding 157 is connected to the main line conductor 143 by a conductor 158, and the other terminal of said field winding is connected to the main line conductor 145 by a conductor 159, so that the field winding 157 is excited. The rotor of the transmitter 140 is connected by an arm 161 to the restoring rod 90 heretofore referred to, so that any movement of the restoring rod will result in a corresponding movement being imparted to the rotor of the transmitter 140.

The different phase points of the armature windings 156 of the transmitter 140 are connected by conductors 162, 163, and 164 to the like phase points of the three-phase armature windings 165 of the electrical indicating device 138.

The indicating device 138 has a single phase field winding 166, one terminal of which is connected to the main line conductor 143 by a conductor 167, and the other terminal of which is connected to the other main line conductor 145 by a conductor 168, so that the field winding 166 is excited.

The rotor of the indicating device 138 is adapted to actuate an indicating hand or pointer 169 which cooperates with a suitable graduated scale for indicating the relative position of the runner blades. The pointer 169 responds to changes in the angular position of the runner blades owing to the transmission of equal angular motion to the rotor of the indicating device 138 from the rotor of the transmitter 140.

In this form of the invention a manually operated switch device 170 is provided for controlling the circuits of the solenoids 99 and 100 heretofore referred to. If so desired the switch 170 may be located on the switchboard or otherwise be disposed adjacent to the indicating devices 137 and 138 so as to be convenient for the attendant.

As shown in Fig. 10, a terminal 171 of the switch 170 is connected to the main line conductor 145, by a conductor 172. A terminal contact 173 is connected by a conductor 174 to one terminal of the solenoid 100, and a terminal contact 175 is connected by a conductor 176 to one terminal of the solenoid 99. The other terminals of the solenoids 99 and 100 are connected by a single conductor 177 to the main line conductor 143.

The switch 170 has a push button or movable member 178 which is movable into one position to connect the contacts 171 and 173 and movable into another position to connect the contacts 171 and 175.

When the contacts 171 and 173 are connected the circuit is completed from the main line conductor 143, through conductor 177, windings of the solenoids 100, and thence through conductor 174, contacts 173 and 171 and conductor 172 to the main line conductor 145, so that the solenoid 100 is energized.

When the contacts 171 and 175 are connected, the circuit is completed from the main line conductor 143 through conductor 177, windings of the solenoid 99 and thence through conductor 176, contacts 175 and 171 and conductor 172, to the main line conductor 145, so that the solenoid 99 is energized.

With the energization of either of the solenoids the friction roller mechanism is operated in the manner hereinbefore described to effect the adjustment of the runner blades.

In the form of the invention shown in Fig. 10, the attendant while occupying a position at the power house switchboard or other point remote from the turbine may, by appropriately operating the switch 170, set the runner blade adjusting mechanism into operation in the appropriate direction to maintain the runner blades in proper relationship with the wicket gates.

When the governor 21 operates to change the position of the wicket gates, the movement of the link 116 will be transmitted through the lever 147 to the rotor of the transmitter 139. The rotation of the rotor of the transmitter 139 is transmitted to the rotor of the indicating device 137, under the influence of the voltage in the interlinked rotor windings tending to bring the rotors into angular agreement, so that the rotor of the indicating device 137 is rotated to a position corresponding to that into which the rotor of the transmitter 139 has been rotated. The position to which the rotor of the indicating device 137 has been moved is indicated on the scale of the indicating instrument by the pointer 155.

When the position of the wicket gates has been changed the position of the pointer 169 of the runner blade indicating device 138 will not corresponding with the position of the pointer 155 of the wicket gate indicating device 137, and in order to bring the runner blades into proper relationship with the gates, as indicated by the respective indicating devices, the switch 170 is operated to effect the energization of the solenoid 99 or 100, so as to cause the operation of the runner blades adjusting means.

Since the restoring rod 90 is connected to the runner blade adjusting means and moves downwardly or upwardly while the runner blades are moving toward open or closed position respectively, and the restoring rod is connected by the arm 161 to the rotor of the transmitting device 140, the rotor of said transmitting device will begin to rotate as soon as the change in angle or position of the runner blades commences. The rotation of the rotor of the transmitting device 140 is transmitted to the rotor of the indicating device 138, under influence of the voltages in the interlinked rotor windings tending to bring the rotors into angular agreement, so that the rotor of the indicating device 138 is rotated to a position corresponding to that into which the rotor of the transmitting device 140 has been rotated. This action of the rotor of the indicating device 138 causes the pointer 169 to move over the scale or indicating dial of said device. When the pointer 169 has moved to a position which corresponds with the position of the pointer 155 of the indicating device 137 the switch 170 is operated to open the circuit of the solenoid 99 or 100 so that said solenoids are de-energized.

When either solenoid is de-energized the runner blade adjusting means will cease to operate as has been heretofore described and the parts will then remain so positioned until the switch 170 is again operated to close a solenoid circuit.

In this way the runner blades can be brought into a position corresponding to the position of the wicket gates.

Fig. 11 illustrates another form of the invention, in which means are provided for automatically maintaining the angle or opening of the runner blades in proper relationship with the position of the wicket gates.

In this form of the invention, a floating lever 180 is employed. One end of the lever 180 is operatively connected by suitable linkage 181 to the link 116 attached to the gate operating governor in the manner theretofore described, so that this end of the lever 180 will be raised and lowered incident to the movements of the gates to vary the angle or opening thereof. The opposite end of the lever 180 is operatively connected by linkage 182 to the restoring rod 90 heretofore referred to, so that when one end of the lever 180 is lowered or raised by the opening or closing movement of the wicket gates the other end of said lever will be moved in the opposite direction by the corresponding movement of the runner blades.

The lever 180 carries at a point between its ends, an electrical contact 183, which is disposed between a pair of electrical contacts 184 and 185. The construction is such that the lever 180 will have a limited motion between the contacts 184 and 185 before the contact 183 engages either of the contacts 184 and 185, so that the contact 183 may occupy a position between and out of engagement with the contacts 184 and 185.

A pilot device 186 is provided for controlling the circuits through which current is supplied to the solenoids 99 and 100, said device comprising two switch members 187 and 188, which are operated respectively by relay coils 189 and 190.

The contact 184 is connected by a conductor 191 to one terminal of the relay coil 189, and the contact 185 is connected by a conductor 192 to one terminal of the relay coil 190, the switch contact 183 being connected to the other terminals of said relay coils by a conductor 193.

The relay coils 189 and 190 are adapted to be energized by low-voltage electric current, as supplied from a storage battery 194 connected to the conductor 193.

The switch member 187 is adapted to engage contacts 195 and 196, and the switch member 188 is adapted to engage the contact 196 and a contact 197.

The contact 195 is connected to one terminal of the solenoid 100 by a conductor 198, and the contact 197 is connected to one terminal of the solenoid 99 by a conductor 199. The contact 196 is connected to the main line high voltage conductor 200 by a conductor 201, and the other main line high voltage conductor 202 is connected to the other terminals of the solenoids 99 and 100 by a conductor 203.

In operation, when the governor operates to swing the wicket gates toward open or closed position to vary the gate opening to conform with variations in the load on the turbine, the link 116 will operate the floating lever 180, through the linkage 181, and move the movable contact 183 into engagement with either of the contact members 184 or 185, according to the direction in which the governor operates, thereby closing the electrical circuit through which either the relay coil 189 or 190 is energized by low-voltage current from the storage battery 194. When the relay coil 189 is energized, the switch member 187 is engaged with the contacts 195 and 196, and the circuit is closed through which high voltage current is supplied for energizing the solenoid 100. When the relay coil 190 is energized, the switch member 188 is engaged with the contacts 196 and 197, and the circuit is closed through which high voltage current is supplied for energizing the solenoid 99.

With the energization of either of the solenoids the friction roller mechanism is operated in the manner hereinbefore described to effect the adjustment of the runner blades.

Since the restoring rod 90 is connected by the linkage 182 to the floating lever 180 and moves downwardly or upwardly while the runner blades are moving toward open or closed position respectively, the lever 180 is moved in the direction in which the contact 183 is moved from the contact 184 or 185 with which it is in contact, so that the circuit through which the solenoid is energized is opened, and such solenoid is de-energized, thereby permitting the friction roller drive mechanism to come to rest in the manner heretofore described.

In the operation of this form of the invention, the movement of the governor in response to a change in load, not only moves the wicket gates toward open or closed position to compensate for the variation in load and thereby maintain constant the speed of the turbine but it also acts through the linkage 181 to move the end of the floating lever 180 in a corresponding direction so that the runner blade adjusting mechanism is also operated in the manner above described. Since the other end of the lever 180 is connected to the restoring rod 90 and the restoring rod moves in accordance with the adjustments of the runner blades, the end of the lever 180 connected to the restoring rod through the linkage 182, will be shifted in a direction opposite to that in which its other end is shifted by the gate operating governor, so that as soon as the runner blade adjusting mechanism has commenced to operate in accordance with the movement of the gates, the movement applied to one end of the lever 180 by the restoring rod 90 will counteract the effect of the movement of the opposite end of said lever by the governor.

Thus, if the governor moves the left hand end of the lever 180 (Fig. 11) upwardly, as for example, in moving the gates toward closed position, this upward movement will take place around the right hand end of said lever as a pivot and will cause engagement of the contact 183 with the contact 184. While the gates are still moving the runner blades start to move through the operation of the runner blade adjusting mechanism, and the right hand end of the lever 180 will have a downward motion around the left hand end of the lever as a pivot. The opposite motions thus imparted to the opposite ends of the lever 180 counteract the effect of the motion of the left hand end of the lever on the switch contacts. The movement of the left hand end of the lever 180 is definitely limited by the governor, but the opposite end of the lever will continue to move as long as the contact 183 is in engagement with the contact 184. Therefore, the right hand end of the lever 180 will continue its downward motion until the switch contact 183 is in disengaged position between the contacts 184 and 185. The solenoid 100 which was energized is then de-energized, so that the operation of the runner blade adjusting mechanism will be interrupted. The runner blades will then have been brought to an angle or opening corresponding with that into which the gates have been brought by the governor.

The operation is similar when the governor moves the gates toward open position, the ends of the lever 180, however, being then moved by the governor and restoring rod in directions opposite to those stated above and the runner blade adjusting mechanism being set into operation to move the runner blades toward open position by the solenoid 99 under control of the contact 185.

The present invention as hereinbefore described provides novel and improved means whereby the adjustable runner blades of a hydraulic turbine may be opened or closed to conform with the opening or closing of the wicket gates by the usual governor, to maintain the speed of the turbine constant under increases or decreases in load, so that the runner blades may always occupy an angle or position which corresponds with a definite position of the wicket gates as determined by the output of the turbine.

In using the runner blade angle indicator 138 and the wicket gate angle indicator 137 shown in Fig. 10, the proper positions of the runner blades for the various positions that may be assumed by the gates under the action of the governor will be indicated on the dials of these indicators as a visual guide, so that an attendant may know how the runner blades should be adjusted to bring them into proper relationship with the gates, but in the automatic runner blade adjusting system shown in Figs. 9 and 11, the connections between the governor and the restoring rod and the switch and its control means are so proportioned as to always maintain automatically the proper relationship between the angle or opening of the gates and the angle or opening of the runner blades to obtain the best efficiency throughout the range of output.

It will be obvious that the runner blade angle indicator 138 shown in Fig. 10 may be used without the gate angle indicator if desired, and either or both of such indicators may be used in addition to or combined with the forms of the invention shown in Figs. 9 and 11.

In some cases it may be of advantage to reduce the weight of the runner shaft, and in my copending application Serial No. 556,798 now Patent No. 1,892,404 of December 27, 1932, I have shown the threaded sleeve 39, screw 40 and speed reducer 41 located within the hub of the runner in proximity to the cross head 36.

Having thus described my invention, what I claim and desire to secure by Letters Patent is:—

1. In a hydraulic turbine of the character described, the combination with a runner having blades movable into different angular positions, of blade adjusting means comprising friction rollers rotatable with the runner and also rotatable on their own axes, and a pair of non-rotating tracks, located at opposite sides of said rollers said tracks being spaced from the rollers when the blade adjusting means is inoperative and being movable axially of the runner to respectively cooperate with said rollers to cause them to rotate on their axes in either direction.

2. In a hydraulic turbine of the character described, the combination with a runner having blades movable into different angular positions, of blade adjusting means comprising a series of rollers rotatable with the runner and also rotatable on their own axes, a housing having a pair of opposed tracks between which the series of rollers travel, the housing being movable to bring one or the other of said tracks into engagement with the series of rollers to cause rotation thereof in either direction about their axes, and means for normally holding the housing in a neutral position with both of the tracks thereon out of engagement with said series of rollers.

3. In a hydraulic turbine of the character described, the combination with a runner having blades movable into different angular positions, of blade adjusting means comprising a series of rollers rotatable with the runner and also rotatable on their own axes, a pair of opposed tracks between which the rollers travel, said tracks being movable into engagement with the rollers to cause rotation thereof in either direction about their axes, and means for normally holding the tracks out of engagement with the rollers.

4. In a hydraulic turbine of the character described, the combination with a runner having blades movable into different angular positions, of blade adjusting mechanism comprising a part movable into either of two positions to adjust the runner blades in one or the other direction, springs normally holding said movable part intermediate of said runner blade adjusting positions, a reciprocatory controlling member, springs interposed between said controlling member and said movable part of the blade adjusting mechanism for transmitting motion from the controlling member to the blade adjusting mechanism and for setting the latter into operation to adjust the runner blades, and solenoids connected to said controlling member for operating it.

5. In a turbine of the character described, the combination with a runner and its shaft, said runner having adjustable blades, of friction means carried by the runner shaft for adjusting the position of the blades, said friction means including a series of rollers rotatable with the runner and also rotatable on their own axes, and a pair of opposed tracks between which the rollers travel, said tracks being movable into engagement with the rollers to cause rotation thereof in either direction about their axes.

6. In a turbine of the character described, the combination with a runner and its shaft, said runner having adjustable blades, of means carried by the runner shaft for adjusting the position of the blades, said means including a series of rollers rotatable with the runner and also rotatable on their own axes, and a pair of opposed tracks between which the rollers travel, said tracks being normally disposed out of engagement with the rollers, and means for moving the tracks into engagement with the rollers to cause rotation of the rollers in either direction.

7. In a hydraulic turbine of the character described, the combination with a runner having blades movable toward open and closed positions, of blade adjusting mechanism embodying rollers rotatable with the runner and also rotatable on their own axes, and a controlling member having opposed tracks between which said rollers travel, said tracks being movable axially of the turbine in opposite directions to operatively engage said rollers.

8. In a turbine, the combination with a runner having rotatably adjustable blades, of friction means for moving the blades into different angular positions, said friction means including rollers rotatable with the runner and also rotatable on their own axes, and a pair of opposed tracks between which the rollers travel said tracks being normally disposed out of engagement with said rollers, and electrically controlled means for operatively positioning the tracks with said rollers.

9. In a hydraulic turbine, the combination with a runner having blades movable into different angular positions, of adjusting mechanism for the blades comprising a plurality of rollers rotatable with the runner and also rotatable on their own axes, a pair of opposed tracks movable in opposite directions for engaging said rollers, and electro-magnetic devices for moving said tracks into operative position with said rollers.

10. In a hydraulic turbine, the combination with a runner having blades movable into different angular positions, of blade adjusting mechanism operative to move the blades in either direction, said blade adjusting mechanism including a plurality of rollers rotatable with the runner and also rotatable on their own axes and a pair of opposed tracks movable in opposite directions for engaging said rollers, means yieldingly supporting said tracks, and solenoids connected to said track supporting means for operating the same.

11. In a hydraulic turbine, the combination with a runner having blades movable into different angular positions, and gates movable into different angular positions and controlling the flow of the driving fluid to the runner, of mechanism for adjusting the angular positions of the runner blades, said mechanism comprising a plurality of rollers rotatable with the runner and also rotatable on their own axes, a pair of opposed tracks movable in either direction for engaging said rollers, electro-magnetic means for controlling the operation of said blade adjusting mechanism, and switch means controlled according to the relative positions occupied by the gates and runner blades for controlling the operation of said electro-magnetic means.

12. In a hydraulic turbine, the combination with a runner having blades movable into different angular positions, and gates movable into different angular positions and controlling the flow of the driving fluid to the runner, of mechanism for adjusting the angular positions of the runner blades, said mechanism comprising a plurality of rollers rotatable with the runner and also rotatable on their own axes, a pair of opposed tracks movable in either direction for engaging said rollers, electro-magnetic means for controlling the operation of said blade adjusting mechanism, switch means for controlling the operation of said electro-magnetic means, and self-synchronous motors connected to the runner blades and gates respectively and controlling the operation of said switch means.

13. In a hydraulic turbine, the combination with a runner having blades movable into different angular positions, and gates movable into different angular positions and controlling the flow of the driving fluid to the runner, of mechanism for adjusting the angular positions of the runner blades, said mechanism comprising a plurality of rollers rotatable with the runner and also rotatable on their own axes, a pair of opposed tracks movable in both directions for engaging said rollers, electro-magnetic means for controlling the operation of said blade adjusting mechanism, switch means for controlling the operation of said electro-magnetic means, and a lever connected to the runner blades and gates and controlling the operation of said switch means.

14. In a hydraulic turbine, the combination with a runner having blades movable into different angular positions, and gates movable into different angular positions and controlling the flow of the driving fluid to the runner, of mechanism for adjusting the angular positions of the runner blades, said mechanism comprising a plurality of rollers rotatable with the runner and also rotatable on their own axes, a pair of opposed tracks movable into engagement with said rollers for effecting rotation thereof in either direction, means operatively connecting the rollers with the runner blades, electrically controlled means for operating the tracks, self-synchronous motor operated means connected to the runner blades and gates respectively for indicating the respective angular positions of the runner blades and gates, and switch means controlling the operation of said electrically controlled means.

15. In a hydraulic turbine, the combination with a runner having blades movable into different angular positions, and gates movable into different angular positions and controlling the flow of driving fluid to the runner, of friction means for moving the blades into different positions, said friction means including a plurality of rollers rotatable with the runner and also rotatable on their own axes, a pair of opposed tracks movable into engagement with said rollers for effecting rotation thereof in both directions, means operatively connecting the rollers with the runner blades, electrical means for indicating the angular positions of the runner blades and gates, and electrical means controlling the operation of said friction means, both of said electrical means being synchronized with each other.

16. The combination with a runner having blades movable into different angular positions, and gates movable into different angular positions and controlling the flow of driving fluid to the runner, of means operative by the rotating motion of the runner for moving the blades into different positions, said means including rollers operatively connected with said runner blades and a pair of opposed tracks movable in either direction for engaging said rollers, electrically operated means for indicating the respective angular positions of the runner blades and gates, and means associated with said indicating means for controlling the operation of said blade adjusting means.

17. The combination with a runner having blades movable into different angular positions, and gates movable into different angular positions and controlling the flow of driving fluid to the runner, of means operative by the rotating motion of the runner for moving the blades into different positions, said means including rollers operatively connected with said runner blades and a pair of opposed tracks movable in either direction for engaging said rollers, means for moving the gates to different positions, electrically operated means for respectively indicating the angular positions of the runner blades and gates, electrically operated means for controlling the operation of said blade adjusting means, and electrical means operatively connected to said runner blades for controlling the operation of said indicating means and said blade adjusting means.

18. The combination with a runner having blades movable into different angular positions, and gates movable into different angular positions and controlling the flow of driving fluid to the runner, of means for moving the blades into different positions, means for moving the gates to different positions, electrically operated means for indicating the angular positions of the runner blades, electrically operated means for indicating the angular positions of the gates, electrically operated means electrically connected with said indicating means for controlling the operation of said blade adjusting means, electrical means operative by a change in position of the runner blades for controlling the operation of said electrically operated means, and electrical means operative by a change in position of the gates for controlling the operation of said electrically operated means.

19. The combination with a runner having blades movable into different angular positions, and gates movable into different angular positions and controlling the flow of driving fluid to the runner, of means for moving the runner blades into different positions, means for moving the gates to different positions, separate electrically operated means for indicating the angular positions of the runner blades and the gates respectively, electrically operated means electrically connected with said indicating means for controlling the operation of said blade adjusting means, a transmitting device operative by a change in position of the runner blades for controlling the operation of said electrically operated means, and a transmitting device operative by a change in position of the gates for controlling the operation of said electrically operated means.

In testimony whereof I have hereunto set my hand.

HJALMAR S. MESSING.